United States Patent Office 3,166,741
Patented Jan. 19, 1965

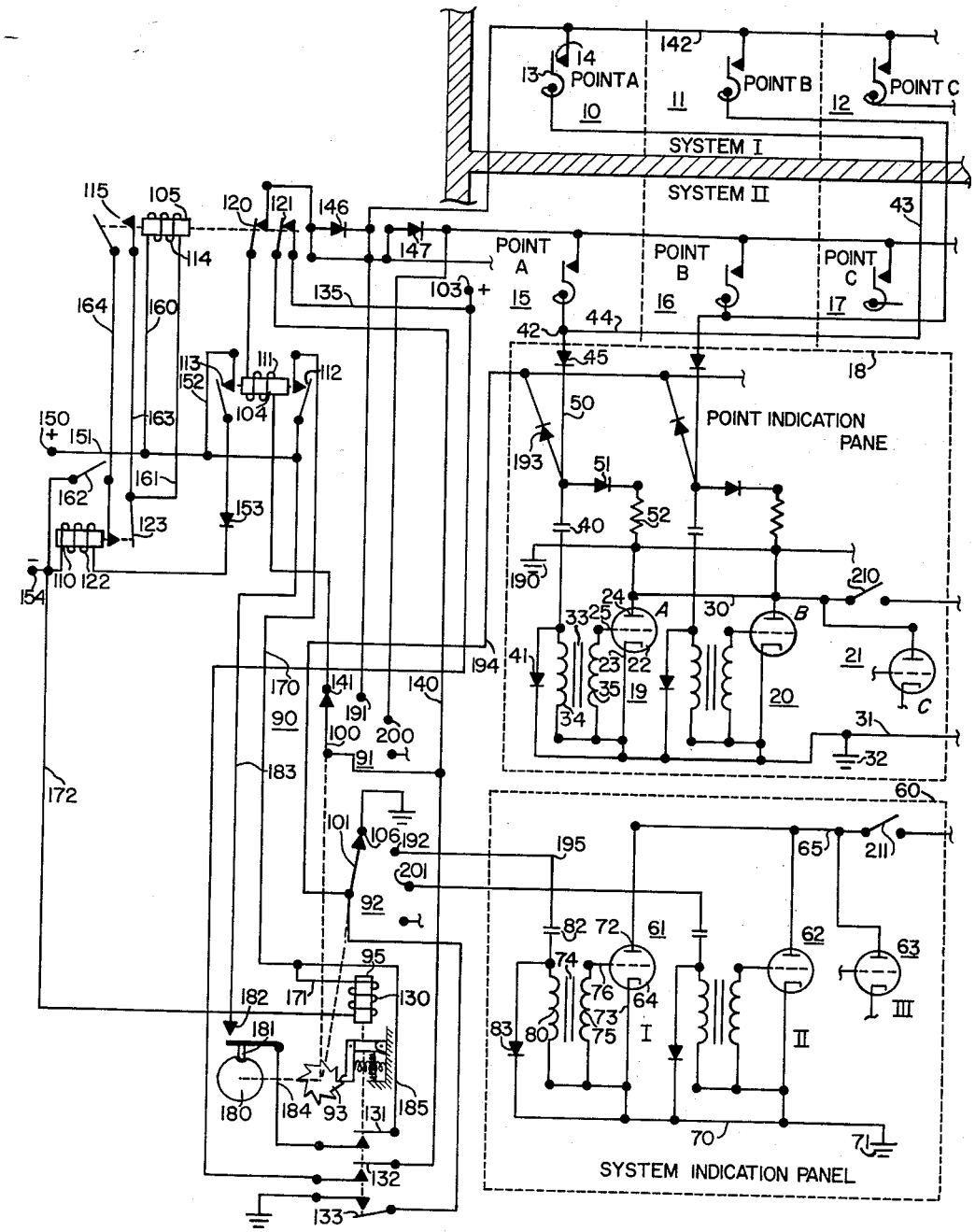

3,166,741
CONTROL APPARATUS
Gary W. Spence, Minneapolis, Minn., assignor to
Honeywell Inc., a corporation of Delaware
Filed Sept. 15, 1961, Ser. No. 138,391
3 Claims. (Cl. 340—213)

The present invention is concerned with an indicating system for indicating the presence of a predetermined condition in one of a plurality of spaces in a plurality of areas and for indicating the area in which the predetermined condition exists.

In the temperature control field where a plurality of spaces are supervised from a central position, a need has arisen for a means of scanning a plurality of condition responsive devices in the spaces to give an almost instantaneous indication of the condition of the spaces. While it is obvious that a condition such as the temperature of each space can be individually measured or indicated on a meter, where a system had a great number of spaces to be supervised, such a method becomes impractical. The present invention provides a means of scanning responsive devices of a great number of spaces to readily provide a visual indication of the temperature of any one of the spaces in the central position. In addition to the indication of the temperature in a plurality of spaces or stations in each of the areas, the temperature in any one of the areas is indicated. The invention provides for a means for indicating the temperature condition of a space by discharging a condenser through a primary circuit of a transformer which has a secondary circuit connected into the control electrode of a neon tube.

An object of the present invention is therefore to provide an improved indicating system for indicating the presence of a predetermined condition in a plurality of spaces in a plurality of areas so that upon a presence of a condition to be indicated the system is initiated and an indication at a central locality readily shows which of the spaces has the predetermined condition and which of the areas contains a space having the predetermined condition.

Another object of the present invention is to provide an improved indicating system with an indication means comprising a neon bulb which is fired by the discharging of the condenser through a control circuit.

These and other objects will become apparent upon the study of the following specification and drawing of which The single figure is a schematic representation of the indication system showing two areas with a plurality of spaces in each area to make a system and the central panel having the lights for indicating which of the stations of the two areas has a predetermined condition.

Referring to the single figure, a plurality of spaces 10, 11 and 12 containing Points A, B and C, respectively, have temperature responsive or condition responsive switch means which close a switch when the temperature reaches some predetermined value. A representative temperature responsive means is shown in space 10 having a bimetal 13 which closes a switch 14 when the temperature in space 10 decreases below some predetermined value. The temperature responsive switch means shown in spaces 10, 11 and 12 make up a multi-point system I which might be contained on one floor of the building.

A second system is shown as on a lower floor of a building in spaces 15, 16 and 17. Spaces 15, 16 and 17 contain similar temperature responsive switch means at Points A, B and C to make System II. While only Systems I and II are shown, the apparatus may be made up of many systems each containing a number of spaces at various places on the building floor to correspond to the Points A, B and C of System I and Points A, B and C of System II. For example, each of many systems might contain numerous spaces and corresponding condition responsive means; however, only two systems are shown.

A panel 18 contains a plurality of indicating means or devices 19, 20 and 21. Each of the indicating devices is similarly constructive; therefore, an explanation of indicating device 19 is considered sufficient to understand the operation of the other indicating devices. Device 19 is made of a neon tube 22 which has two power electrodes 23 and 24 and a control electrode 25. When power electrodes 24 and 23 are connected across a source of power between a bus 30 connected to the positive D.C. source of voltage and a bus 31 connected to ground 32, the bulb will fire to produce an indication light when the voltage applied to the control electrode 25 reaches some predetermined value. A transformer 33 has a primary winding 34 and a secondary winding 35. Secondary 35 is connected between electrode 23 and 25. Primary 34 is connected between the electrode 23 and a condenser 40. A rectifier or uni-directional current conducting device 41 is connected in parallel with primary 34. Condenser 40 is charged by a current passing through diode 41 to ground 32 when the charging voltage is removed and a discharging circuit is provided, a discharge current flowing in primary 34 causes a voltage to be applied to control electrode 25 to fire tube 22.

Each of the corresponding Points A of the System I and II are connected to a terminal 42 by conductors 43 and 44, respectively. Terminal 42 is connected to a uni-directional current conducting device or rectifier 45 and then to condenser 40 by a conductor 50. Conductor 50 is connected to ground through another uni-directional current conducting device or diode 51 and a resistor 52 connected in series. Corresponding Points B in Systems I and II are connected in common to the indication means 20 in a similar manner as pointed out with indication means 19. Indicating means 19 can be energized by one or more of the corresponding devices at Points A.

A second panel 60 has indication means 61, 62 and 63 for indicating which of the Systems I and II above has a point or space temperature above some predetermined value. Indicating system 61 will be explained as representative of the other indication systems in panel 60. A neon bulb or lamp 64 is connected between a power bus 65 which is connected to a positive source of power and a ground bus 70 which is connected to ground 71. The power electrodes 72 and 73 are connected to bus 65 and 70, respectively, so that upon the presence of a voltage on a control electrode 76, lamp 64 will light up to provide an indication on panel 60. Connected in the control circuit of indicating means 61 is a transformer 74 which has a primary circuit and a secondary 75. The secondary circuit 75 is connected between power electrode 73 and control electrode 76. A primary winding 80 is connected between ground 71 and a condenser 82. Connected in parallel with winding 80 is a uni-directional current sensing device or diode 83.

A stepping circuit 90 is used to apply power to the various temperature responsive devices at Points A, B and C to obtain an indication on panels 18 and 60 depending on which of the temperature responsive switch devices are closed. A pair of stepper switches 91 and 92 are controlled in sequence by a ratchet type mechanism having a gear 93. A pawl 94 associated with the gear is allowed to drop downward under the force of a spring upon the de-energization of a stepper relay 95 to turn the gear. Movable members 100 and 101 move in clockwise direction to contact a number of contacts of the switches 90 and 92, respectively. Normally, as shown, member 100 rests on a contact 141 and member 101 rests on a grounded contact 106. In order to initiate the operation of the stepper switches and to maintain the operation until voltage is applied to all of the temperature responsive switch means in both Systems I and II, the remaining circuit of network circuit 90 is used.

A source of positive D.C. voltage is available at terminal 103 for the operation of relays 104, 105 and 110. Relay 104 has an energization winding 111 and two normally open switches 112 and 113 actuated thereby. Relay 105 has an energization winding 114 with one normally open switch 115 and two normally closed switches 120 and 121 actuated thereby. Relay 110 has an energization winding 122 and a normally open switch 123 actuated thereby. Stepper relay 95 has an energization winding 130 and two normally closed switches 131 and 132 and a normally open switch 133 actuated thereby.

Power source 103 is connected in a manner to energize relay 104 when any one of the switches at Points A, B and C of System I or II are closed through a circuit traced as follows: from terminal 103, a conductor 135, switch 121, conductor 140, member 100, a contact 141, winding 111, switch 120 and to each of the buses 142 and 143 of System I and II through uni-directional current conducting devices 146 and 147, respectively. Bus 142 of System I is connected to each of the switches of Points A, B and C. Bus 143 is similarly connected to the switches of Points A, B and C. From the previous circuit mentioned, the presence of at least one closed switch 14 at any one of the points in the two systems would apply the voltage at the terminal 103 to the condenser 40 of the indicating devices of panel 18 through the circuit made up of rectifier 45, condenser 40, rectifier 41, and ground 32. Indicating device 20 of panel 18 would be energized in a similar manner if the switch of Points B of either Systems I and/or II were closed.

If any one of the switches of System I or II is closed, a voltage from power terminal 103 through winding 111 energizes relay 104. When switch 113 closes relay 110 is energized through a circuit traced as follows: a positive power terminal 150, a conductor 151, conductor 152, switch 113, a uni-directional current conducting device or diode 153, winding 122, and back to the other side of source of power 154. Upon the energization of relay 110, switch 123 closes to energize relay 105 through a circuit traced as follows: terminal 150, conductor 151, conductor 160, winding 114, conductor 161, switch 123, a reset switch 162, and back to the other side 154 of the source of power. A holding circuit for relay 105 is available through the circuit traced as follows: from terminal 150, conductor 151, conductor 160, winding 114, conductor 161, conductor 163, switch 115, conductor 164, and back to the negative terminal 154 the source of power through switch 162.

Upon the energization of relay 104 to close switch 112, source of power 150 is connected to the stepper relay 95 through a circuit traced as follows: conductor 151, switch 112, a conductor 170, a conductor 171, winding 130, a conductor 172, and back to the other side of source of power 154. As soon as the stepper is energized, and relay 104 is de-energized by the subsequent opening of switch 120, stepper relay 95 is de-energized to allow the cam 94 to drop and to move gear 93 one step forward in a clockwise direction. A cam 180 which is attached to the gear moves to lift cam rider 181 to close switch 182. Switch 182 provides another energization circuit for relay 95 traced as follows: from terminal 150, conductor 151, a conductor 183, switch 182, a conductor 184, switch 131, a conductor 185, conductor 171, winding 130, conductor 172, and back to the negative side 154 of the source of power. Each time relay 95 is energized to open switch 131, the relay is subsequently de-energized; therefore, the stepper moves gear 93 in a clockwise direction quite rapidly to move members 100 and 101 in a clockwise direction to contact the various contacts of the switch 91 and 92, respectively. This sort of stepper is quite conventional and other ways of obtaining a movement of switch 91 and 92 to scan the various buttons of the switches to apply the voltage to the various points of the Systems I and II are available.

Once the stepper network circuit 90 is energized and switches 91 and 92 begin the clockwise movement, the complete cycle is completed before the switches 91 and 92 stop. The cycle is completed by the switch 182 which opens when the cam 180 moves 360° to allow rider 181 to drop into the appropriate notch. When switch 182 opens, the energization circuit for relay 95 is broken and the stepper remains in the position as shown until reset switch 162 is opened to de-energize relay 105 to place relay 104 back in the position to be energized on the presence of a closed switch and at one of the points in the systems.

*Operation*

As shown the system is on standby and none of the indicating lights have been energized in panels 18 and 60. Assuming that there is a power supplied to terminal 150, 103, and buses 30 and 65, the invention will operate in the following manner. Let us assume that an over temperature condition exsits at Point A in System I and switch 14 closes. A circuit is then established to energized relay 104 through the rectifier 146. The circuit for the energization of the relay 104 can be traced as follows: from terminal 103, conductor 135, switch 121, conductor 140, member 100, terminal 141, winding 111, switch 120, rectifier 146, switch 14, conductor 43, rectifier 45, conductor 50, rectifier 193, conductor 194 and member 101 to ground. The energization of relay 104 brings about the energization of relay 105 and 110 as mentioned previously which starts the stepping operation of relay 95 to move members 100 and 101 in a clockwise direction. When member 100 moves one space in a clockwise direction to contact terminal 191, voltage is supplied from terminal 103 through switch 132 and member 100 to bus 142. As long as switch 14 of Point A is closed, the voltage is supplied through diode 45 to the indicating device 19 to charge condenser 40 through the previously mentioned circuit comprising diode 41 and ground 32.

At the same time, member 101 moves to engage a first contact 192 of switch 92. A similar voltage is available through the circuit including conductor 50, uni-directional current conducting device or diode 193, a conductor 194, member 101, contact 192, conductor 195, to charge condenser 82 through the circuit including diode 83, and ground 71. The application of the voltage to contact 191 also applies voltage to the other indicating devices of panel 18 if any one of the other switches at Point B and C of System I and II are closed. In this manner the condensers of the various indicating devices of panel 18 are charged depending upon whether the respective switches at Point A, B, and C of System I are closed. As soon as stepper relay 95 is energized, switch 133 closes to connect member 101 to ground. The voltage which was previously applied to condensers 40 and 82 through the now opened switch 132 is then allowed to discharge to ground through switch 133. Upon the discharging of the condensers 40 and 82, a current is induced in the secondary windings of the two transformers 33 and 74 to cause a voltage to be applied to the control electrodes of neon lamps 22 and 64. With the firing of the neon lamps 22 and 64, an indication is provided on panel 18 and 60, respectively that space 10 has an abnormal temperature.

Since the stepper relay 90 is energized and de-energized in a repeating manner, member 100 moves to the next contact 200 and member 101 moves to the next contact 201. The voltage of terminal 103 is then applied to bus 143, and if any of the switches in System II are closed, the respective indicating means of panel 18 will be energized in a similar manner as pointed out in connection with System I. If any of the switches are closed in System II, the System II indicating device 62 will be energized.

Upon the energization of stepper relay 95 to move a ratchet upward so the gear 93 can be moved to move members 100 and 101 to the next contact, switch 133 is closed and the condensers associated with the indicating device indicating means in panel 18 and the condenser of indicating means 62 are discharged to ground. If by chance, both Points A of System I and II are closed, only a single light will light on panel 18; however, the system lights of panel 60 for both the System I and II or indicating means 61 and 62 will be energized.

The operation will continue in the manner described till members 100 and 101 have stepped in a clockwise direction to contact all of the contacts of switches 91 and 92 depending upon the number of points and the number of systems involved in the apparatus. When the stepping mechanism has reached the initial starting position, the relay 95 can no longer be energized.

At this time, an observer can look at panel 18 and 60 to see what points in the various systems are abnormal or are over temperautre.

Upon the operation of the reset switch 162 to restore the system so that another sequence of operation of the stepper 90 can take place, switches 210 and 211 are broken to de-energize the lights of panel 18 and 60.

While the system has been described in one particular manner, changes to this system could be made which are in the realm of one skilled in the art; therefore, the scope of the present invention is intended to be limited by the appended claims in which

I claim:

1. In an indicating system for indicating the presence of a predetermined condition in any one of a plurality of spaces, a plurality space condition responsive switch means providing a closed circuit upon the presence of a predetermined condition, said switch means being divided in a first and a second group, a plurality of indication means, said indication means comprising a neon tube with a transformer connected to the firing element so said tube is fired when a predetermined voltage is generated by a current in the primary circuit of said transformer, a condenser for each indication means, means connecting said condenser to said primary circuit so that said indication means is energized when said condenser is discharged, circuit means for connecting each of said plurality of switch means to one of said indication means, a source of power, first switch means having at least two circuits closed for a predetermined period in sequence, circuit means including one of said two circuits for connecting said source to said first group of switch means, circuit means including another of said two circuits for connecting said source to said second group of switch means, said source charging said condenser of said indication means, condition responsive switch means which are closed during said predetermined period so upon said condenser discharging said indication means associated with said condition responsive switch means is energized, second switch means having at least two circuits closed for a predetermined period in sequence with said first switch means, circuit means including one of said circuits of said second switch means for connecting said source to said condenser of one of said indication means when said first group of switches is connected to said source, and circuit means including another of said circuits of said second switch means for connecting said source to said condenser of another indication means when said second group of switches is connected to said source, said indication means indicating which switch means of each group are closed and which groups of switch means have switch means which are closed.

2. In an indicating system for indicating the presence of a predetermined condition in any one of a plurality of spaces, a plurality of space condition responsive switch means providing a closed circuit upon the presence of a predetermined condition, said plurality of switch means being divided into at least a first and a second group, a plurality of indication means, said indication means comprising a gas tube which is fired when a predetermined voltage is placed on a control electrode of said tube, a condenser for each indication means, means connecting said condenser to said electrode so that said indication means is energized when said condenser is discharged, circuit means for connecting each of said plurality of switch means to one of said indication means, a source of power, first switch means having at least two circuits closed for a predetermined period in sequence, circuit means including one of said two circuits for connecting said source to said first group of switch means, circuit means including another of said two circuits for connecting said source to said second group of switch means, said source charging said condenser of said indication means of each of said plurality of switch means which are closed during said predetermined period, means for opening said circuit means to discharge said condenser to energize said indication means, second switch means having at least two circuits closed for a predetermined period in sequence with said first switch means, circuit means including one of said circuits for connecting said source to said condenser of one of said indication means when said first group is energized, and circuit means including another of said circuits for connecting said source to said condenser of another indication means when said second group is energized, said indication means indicating which switch means of each group are closed and which groups have closed switch means.

3. In an indicating system for indicating the presence of a predetermined temperature in any one of a plurality of spaces, a plurality of temperature responsive switch means for providing a closed circuit when a predetermined temperature exists in each of said spaces, a group of said switch means for each of at least two areas, a plurality of indication means divided into two groups, one of said groups for indicating the temperature condition in said spaces and a second group for indicating the area having the space with said predetermined temperature condition, circuit means connecting each of said switch means of said first group to a respective indication means, circuit means connecting each of said switch means of said second group in a corresponding manner to said indication means of said first group so that one of said switch means of each group can effect the same indication means, stepping switch means having a first and second portion, a source of power, relay means connected to be energized when any one of said temperature responsive switch means closes, circuit means including said relay means when energized for connecting said stepping switch means to said source to operate said stepping switch means through a cycle of operation, means including said first portion of said stepping switch means for connecting said source to said groups of switch means in sequence in one of said cycles of operation so that upon each group being energized said indication means corresponding to said switch means which is closed is energized, and means including a second portion of said switch means and said closed temperature responsive switch means for connecting one of said indication means to said source each time said source is connected to said group of switches in said one cycle of operation to indicate one of said switches of said group is closed.

(References on following page)

References Cited by the Examiner

UNITED STATES PATENTS

| | | | |
|---|---|---|---|
| 2,456,499 | 12/48 | Fritzinger | 340—213 |
| 2,549,401 | 4/51 | Stein et al. | 340—213 X |
| 2,578,447 | 12/51 | Odell et al. | 340—213 |
| 2,605,342 | 7/52 | Spurling | 340—213 X |
| 2,812,976 | 11/57 | Hasenkamp | 340—213 X |
| 2,994,073 | 7/61 | Pelovitz | 340—248 X |
| 3,081,449 | 3/63 | Wernlund | 340—213.1 X |
| 3,107,340 | 10/63 | Silliman et al. | 340—214 |

NEIL C. READ, *Primary Examiner.*